(12) United States Patent
Moes et al.

(10) Patent No.: US 9,344,155 B2
(45) Date of Patent: May 17, 2016

(54) INTERFERENCE MITIGATION FOR MULTIPLE INDUCTIVE SYSTEMS

(71) Applicant: Access Business Group International LLC, Ada, MI (US)

(72) Inventors: Benjamin C. Moes, Wyoming, MI (US); Neil W. Kuyvenhoven, Ada, MI (US); Hai D. Nguyen, Grand Rapids, MI (US); Joshua K. Schwannecke, Grand Rapids, MI (US); Dale R. Liff, Kent, OH (US); Andrew Zup, Novelty, OH (US)

(73) Assignee: Access Business Group International LLC, Ada, MI (US)

( * ) Notice: Subject to any disclaimer, the term of this patent is extended or adjusted under 35 U.S.C. 154(b) by 24 days.

(21) Appl. No.: 14/369,417

(22) PCT Filed: Jan. 7, 2013

(86) PCT No.: PCT/US2013/020487
§ 371 (c)(1),
(2) Date: Jun. 27, 2014

(87) PCT Pub. No.: WO2013/103943
PCT Pub. Date: Jul. 11, 2013

(65) Prior Publication Data
US 2014/0349573 A1 Nov. 27, 2014

Related U.S. Application Data

(60) Provisional application No. 61/584,265, filed on Jan. 8, 2012.

(51) Int. Cl.
*H04B 5/00* (2006.01)
*B60L 11/18* (2006.01)
(Continued)

(52) U.S. Cl.
CPC ............ *H04B 5/0037* (2013.01); *B60L 11/182* (2013.01); *E05B 81/88* (2013.01);
(Continued)

(58) Field of Classification Search
None
See application file for complete search history.

(56) References Cited

U.S. PATENT DOCUMENTS

| 5,105,190 A | 4/1992 | Kip et al. |
|---|---|---|
| 5,367,242 A | 11/1994 | Hulman |

(Continued)

FOREIGN PATENT DOCUMENTS

| CN | 101414765 | 4/2009 |
|---|---|---|
| EP | 0 533 247 | 3/1993 |

(Continued)

OTHER PUBLICATIONS

International Search Report and Written Opinion of the International Searching Authority for International Application No. PCT/US13/20487 mailed Apr. 8, 2013.

*Primary Examiner* — Alejandro Rivero
(74) *Attorney, Agent, or Firm* — Warner Norcross & Judd LLP (57) ABSTRACT

A system and method for mitigating interference between two or more inductive systems. Interference can be mitigated by, in response to an interference causing event, temporarily adjusting operation of one or more of the inductive sub-systems to reduce interference. A controller can receives communication from multiple inductive systems and instruct the systems to operate so as to reduce interference. The inductive systems can coordinate to operate out of phase with respect to one another to reduce interference. Communication from a data transfer inductive system can be mimicked by another inductive system so that both systems transmit the communication. Interference between multiple inductive systems can be mitigated by specific physical positioning of the transmitters of the inductive sub-systems.

16 Claims, 9 Drawing Sheets

(51) Int. Cl.
*E05B 81/88* (2014.01)
*H02J 7/02* (2016.01)
*E05B 47/00* (2006.01)

(52) U.S. Cl.
CPC ........... *H04B 5/0031* (2013.01); *H04B 5/0056* (2013.01); *H04B 5/0087* (2013.01); *B60L 2230/14* (2013.01); *B60L 2230/16* (2013.01); *B60L 2250/12* (2013.01); *B60L 2270/147* (2013.01); *E05B 2047/0061* (2013.01); *E05B 2047/0063* (2013.01); *H02J 7/025* (2013.01); *H04B 5/0043* (2013.01); *Y02T 10/7005* (2013.01); *Y02T 10/7088* (2013.01); *Y02T 90/122* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | | |
|---|---|---|---|
| 5,455,466 | A | 10/1995 | Parks et al. |
| 5,574,273 | A | 11/1996 | Nakagawa et al. |
| 5,596,567 | A | 1/1997 | deMuro et al. |
| 5,734,254 | A | 3/1998 | Stephens |
| 5,896,278 | A | 4/1999 | Tamura et al. |
| 5,963,012 | A | 10/1999 | Garcia et al. |
| 6,057,668 | A | 5/2000 | Chao |
| 6,118,249 | A | 9/2000 | Brockmann et al. |
| 6,184,651 | B1 | 2/2001 | Fernandez et al. |
| 6,427,065 | B1 | 7/2002 | Suga et al. |
| 6,469,472 | B1 | 10/2002 | Aoshima et al. |
| 6,825,620 | B2 | 11/2004 | Kuennen et al. |
| 6,844,702 | B2 | 1/2005 | Giannopoulos et al. |
| 6,912,137 | B2 | 6/2005 | Berghegger |
| 7,076,206 | B2 | 7/2006 | Elferich et al. |
| 7,212,414 | B2 | 5/2007 | Baarman |
| 7,366,466 | B2 | 4/2008 | Forster et al. |
| 7,522,878 | B2 | 4/2009 | Baarman |
| 7,623,831 | B2 | 11/2009 | Forster et al. |
| 7,697,892 | B2 | 4/2010 | Komoriya |
| 7,953,369 | B2 | 5/2011 | Baarman |
| 7,989,986 | B2 | 8/2011 | Baarman et al. |
| 8,004,235 | B2 | 8/2011 | Baarman et al. |
| 8,060,011 | B2 | 11/2011 | Jin |
| 8,090,550 | B2 | 1/2012 | Azancot et al. |
| 8,129,864 | B2 | 3/2012 | Baarman et al. |
| 8,194,583 | B2 | 6/2012 | Zhu et al. |
| 2002/0154518 | A1 | 10/2002 | Elferich et al. |
| 2003/0043027 | A1* | 3/2003 | Carson ............... H04B 3/54 375/259 |
| 2003/0214821 | A1 | 11/2003 | Giannopoulos et al. |
| 2004/0130915 | A1 | 7/2004 | Baarman |
| 2005/0068019 | A1 | 3/2005 | Nakamura et al. |
| 2007/0042729 | A1 | 2/2007 | Baaman et al. |
| 2007/0228833 | A1 | 10/2007 | Stevens et al. |
| 2008/0197713 | A1 | 8/2008 | Jin |
| 2008/0200119 | A1 | 8/2008 | Onishi et al. |
| 2009/0010028 | A1 | 1/2009 | Baarman et al. |
| 2009/0011706 | A1 | 1/2009 | Wilson et al. |
| 2009/0101716 | A1 | 4/2009 | Mani et al. |
| 2009/0230777 | A1 | 9/2009 | Baarman et al. |
| 2009/0239496 | A1 | 9/2009 | Toncich et al. |
| 2009/0243394 | A1 | 10/2009 | Levine |
| 2010/0084918 | A1 | 4/2010 | Fells et al. |
| 2010/0142423 | A1 | 6/2010 | Zhu et al. |
| 2010/0151808 | A1 | 6/2010 | Toncich et al. |
| 2010/0171369 | A1 | 7/2010 | Baarman et al. |
| 2010/0171461 | A1 | 7/2010 | Baarman et al. |
| 2010/0328044 | A1* | 12/2010 | Waffenschmidt ....... H02J 7/025 340/10.4 |
| 2011/0018494 | A1* | 1/2011 | Mita ...................... H02J 7/025 320/108 |
| 2011/0050164 | A1 | 3/2011 | Partovi et al. |
| 2011/0115303 | A1 | 5/2011 | Baarman et al. |
| 2011/0163608 | A1 | 7/2011 | Brohlin et al. |
| 2011/0199045 | A1 | 8/2011 | Hui et al. |
| 2011/0204711 | A1 | 8/2011 | Norconk et al. |
| 2011/0223859 | A1 | 9/2011 | Atrash et al. |
| 2012/0153894 | A1 | 6/2012 | Widmer |
| 2012/0161696 | A1* | 6/2012 | Cook ................... B60L 11/182 320/108 |
| 2012/0299538 | A1* | 11/2012 | Arai ..................... B60L 11/182 320/108 |
| 2013/0039395 | A1 | 2/2013 | Norconk et al. |

FOREIGN PATENT DOCUMENTS

| | | |
|---|---|---|
| EP | 2 328 254 | 6/2011 |
| JP | H09-103037 | 4/1997 |
| WO | 2005/109597 | 11/2005 |
| WO | 2005/109598 | 11/2005 |
| WO | 2008/050260 | 5/2008 |
| WO | 2010/107444 | 9/2010 |

* cited by examiner

INTERFERENCE MITIGATION FOR MULTIPLE INDUCTIVE SYSTEMS

BACKGROUND OF THE INVENTION

The present invention relates to reducing or preventing interference between two or more inductive systems.

Inductive systems that operate in close proximity can cause interference with one another. This interference can decrease efficiency in one or both systems. In some circumstances the interference can interrupt operation, interrupt communication, or cause other malfunctions. Inductive systems are commonly used for both data transfer and power transfer.

Many portable devices are programmed to vibrate or make sound when charging is interrupted. Accordingly, even if interference does not significantly effect charging rate, frequent vibration or noise from a portable electrical device can annoy a user and discourage the use of simultaneous use of inductive power supply systems.

SUMMARY OF THE INVENTION

A variety of systems and methods for mitigating interference between two or more inductive systems are provided.

In one aspect, interference is mitigated between multiple inductive sub-systems by altering operation of one or both sub-systems. In one embodiment, in response to an interference causing event, one or more of the inductive sub-systems temporarily adjusts operation to reduce interference. In another embodiment, a controller receives communication from multiple sub-systems, analyzes the communication, and determines how to instruct the sub-systems to operate so as to reduce interference. In yet another embodiment, multiple inductive sub-systems can coordinate to operate out of phase with respect to one another to reduce interference. In another embodiment, where one of the sub-systems is a data transfer inductive sub-system, communication from the data transfer inductive sub-system can be mimicked by the other inductive sub-system so that both sub-systems transmit the communication.

In another aspect, interference between multiple inductive sub-systems can be mitigated by specific physical positioning of the transmitters of the inductive sub-systems. In one embodiment, the transmitter for the first inductive sub-system and the transmitter for the second inductive sub-system are oriented approximately orthogonal to one another in order to reduce interference between them.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

Interference can arise when multiple inductive systems operate in close proximity at the same time. For example, a modern automobile can integrate an inductive charging unit and a wireless communication system. The inductive charging unit can be used to inductively charge an automobile user's portable electronic devices and the wireless communication system can be used to perform a variety of vehicle functions, such as unlocking vehicle doors when a wireless key fob is present or enabling a vehicle power switch when the wireless key fob is present.

Figure 1:
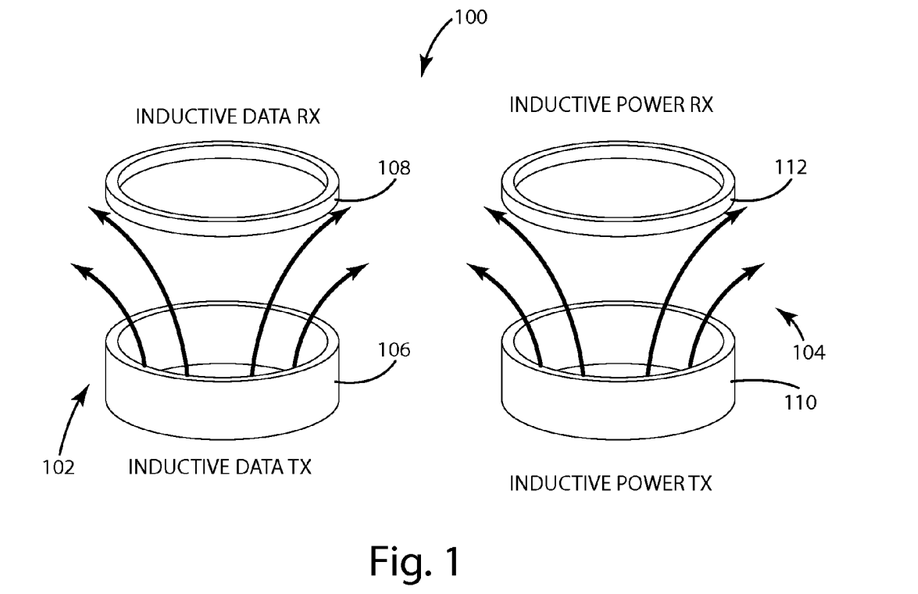
FIG. 1 shows an inductive data transfer system located within one coil diameter distance from an inductive power system.

FIG. 1 illustrates a system 100 that includes an inductive data sub-system 102 and an inductive power sub-system 104 where interference can arise. In one embodiment, the inductive data sub-system 102 can be a wireless key fob system and the inductive power sub-system 104 can be an inductive charging unit for wirelessly charging portable devices, such as cell phones. In alternative embodiments, both sub-systems could be inductive power systems or both systems could be inductive data systems. That is, interference can arise where there are two wireless communication systems, two wireless power systems, or a combination thereof. Although the embodiments are described within the context of two inductive systems, it should be understood that in alternative embodiments there can be additional inductive data systems or inductive power systems, or a combination thereof.

In the embodiment shown in FIG. 1, the inductive data system includes an inductive data transmitter 106 and an inductive data receiver 108. The inductive power system includes an inductive power transmitter 110 and an inductive power receiver 112.

Inductive power systems are generally known and therefore will not be described in detail. Suffice it to say that the inductive power transmitter includes a primary inductor and circuitry to create a time varying current in the primary inductor in order to generate an electromagnetic field. The term primary inductor is not intended to be limiting. A primary inductor can be referred to as a primary coil, primary winding, primary antenna, or essentially any other circuit element capable of generating an electromagnetic field in response to a time varying current. The inductive power receiver includes a secondary inductor and a load, which can utilize the energy transmitted by the inductive power transmitter. That is, when the inductive power receiver is within the presence of the electromagnetic field generated by the inductive power transmitter, AC current is induced in the secondary inductor and power can be provided to a load connected to the inductive power receiver. The term secondary inductor is not intended to be limiting. A secondary inductor can be referred to as a secondary coil, secondary winding, secondary antenna, or essentially any other circuit element capable of receiving an electromagnetic field. Examples of various inductive power systems are disclosed in the following U.S. patents and US patent applications: U.S. Pat. No. 6,825,620, which is entitled "Inductively Coupled Ballast Circuit" and issued Nov. 30, 2004, to Kuennen et al; U.S. Pat. No. 7,212,414, which is entitled "Adaptive Inductive Power Supply" and issued May 1, 2007, to Baarman; U.S. Ser. No. 10/689,148, which is entitled "Adaptive Inductive Power Supply with Communication" and filed on Oct. 20, 2003 to Baarman; U.S. Ser. No. 11/855,710, which is entitled "System and Method for Charging a Battery" and filed on Sep. 14, 2007 by Baarman; U.S. Ser. No. 11/965,085, which is entitled "Inductive Power Supply with Device Identification" and filed on Dec. 27, 2007 by Baarman et al; U.S. Ser. No. 12/349,840, which is entitled "Inductive Power Supply with Duty Cycle Control" and filed on Jan. 7, 2009 by Baarman; U.S. Ser. No. 12/949,317, which is entitled "Multiple Use Wireless Power Systems" and filed on Nov. 18, 2010 by Baarman—each of which are incorporated herein by reference in their entirety.

Inductive data systems are also generally known and therefore will not be described in detail. Examples of inductive data systems include radio systems, WiFi systems, Bluetooth systems, Zigbee systems, NFC systems, RFID systems, backscatter modulation systems and essentially any system that uses electromagnetic energy to transfer information through an inductor such as a winding, antenna, or coil.

Referring back to FIG. 1, the inductive data transfer transmitter is located about within one coil diameter distance from the inductive power receiver. At this proximity, if both systems operate, interference can occur. In other embodiments, the systems can be closer or further apart. For example, inductive systems that have the same size coils can be considered to be in close proximity where they are located less than about ten coil diameters apart.

Figure 2:
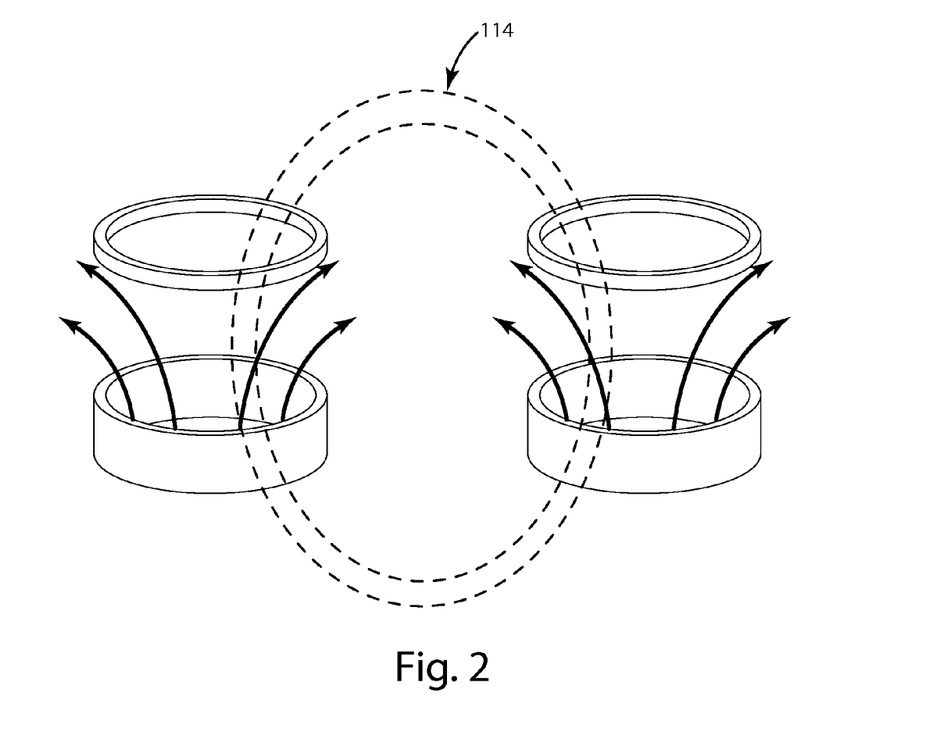
FIG. 2 shows representative field lines that indicate the coupling between the inductive data system and the inductive power system.

FIG. 2 illustrates some representative field lines 114 that indicate how coupling between two inductive systems can occur. That is, the electromagnetic field from the inductive data system can couple to the inductive power transfer system and vice versa. This coupling between the systems can interfere with data transfer and in some circumstances with the power transfer.

The interference between the two or more inductive systems can be mitigated in a number of different ways. In one aspect, interference can be mitigated between multiple inductive sub-systems by altering operation of one or both sub-systems. In another aspect, interference between multiple inductive sub-systems can be mitigated by specific physical positioning of the transmitters of the inductive sub-systems.

Figure 3:
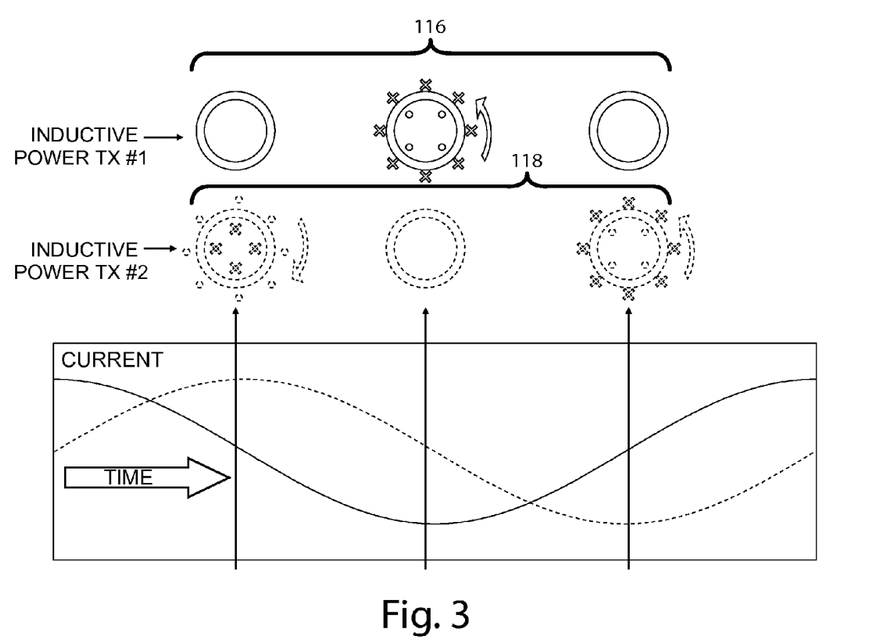
FIG. 3 shows two inductive power transmitting coils operating at the same frequency, but at a phase delay of 90° from one another.

Some embodiments for mitigating interference between two inductive systems include operating one inductive transmitter out of phase from a second inductive transmitter to reduce interference. That is, the two inductive transmitters can be phase locked with respect to one another. In the embodiment illustrated in FIG. 3, two inductive power transmitters 116, 118 are operated about ninety degrees out of phase with one another. That is, the first inductive transmitter is operated at about the same operating frequency as the second inductive transmitter but at about ninety degrees out of phase. In this way, the current in the first inductive transmitter is about the same as the current in the second inductive transmitter except that the current in one transmitter lags the current in the other transmitter by about ninety degrees, or about one quarter of a wavelength in time. Put another way, interference can be limited between two inductive transmitters by operating the two inductive transmitters so that the maximum peak flux from one transmitter occurs when the flux from the other transmitter is at a minimum, and vice versa.

The phase of the current between two inductive transmitters can change during operation. For example, as the position of the first and second inductive receivers change or as the load in the first and second inductive receivers change, or as third party signals interfere, the phase can shift between the first inductive transmitter and the second inductive transmitter. By measuring voltage, current, or another characteristic of power in both inductive transmitters, dynamic adjustments to the timing of one or both of the inductive transmitters can be made. By dynamically changing the timing of the current in one or both of the inductive transmitters, a phase delay of about ninety degrees can be maintained, which reduces interference between the two inductive systems.

When an inductive receiver that is resonant near the operating frequency is coupled to a first inductive power transmitter more than it is coupled to a second inductive power transmitter, then the phase of the current flowing in the inductive receiver will more closely follow the phase of the current in the inductive transmitter that it is more closely coupled to. This is because the receiver has only one resonant circuit, which does not have multiple phases recirculating in the coil.

Figure 4:
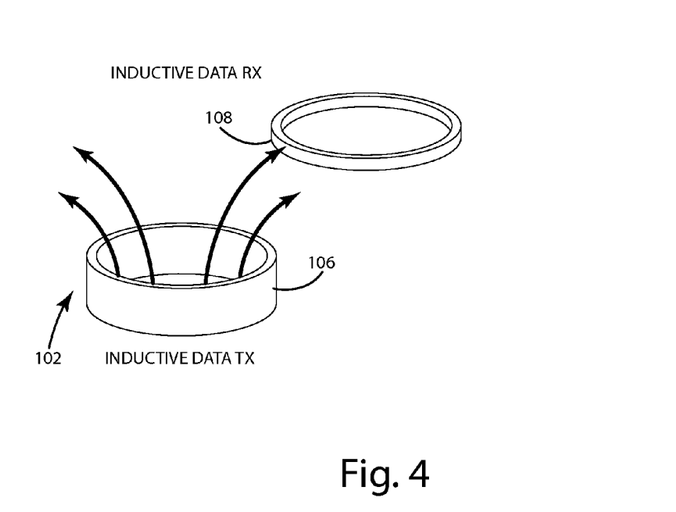
FIG. 4 shows an inductive data receiver moving back and forth between an inductive data transmitter and an inductive power transmitter.

If a receiver's physical location is changing over time such, as shown in FIG. 4, coupling may be changing frequently, which can change the phase of the current in the receiver. In one embodiment, the receiver can receive a syncing signal from the transmitters, it is able to tell which transmitter it is most closely coupled to. Likewise, the transmitters can determine the location of a secondary by measuring the power drawn from both of the transmitters, since a phase contribution coincides with a power contribution (assuming the transmitters are of similar design and efficiency). Once it is identified that a receiver is coupling too much to a transmitter that it is not intended to, the system can vary its operation to prevent interference such as a change in frequency, rail, or can be turned off temporarily. The system may optionally alert the user to a potential interference situation, whether the systems continue to operate or not.

Figure 5:
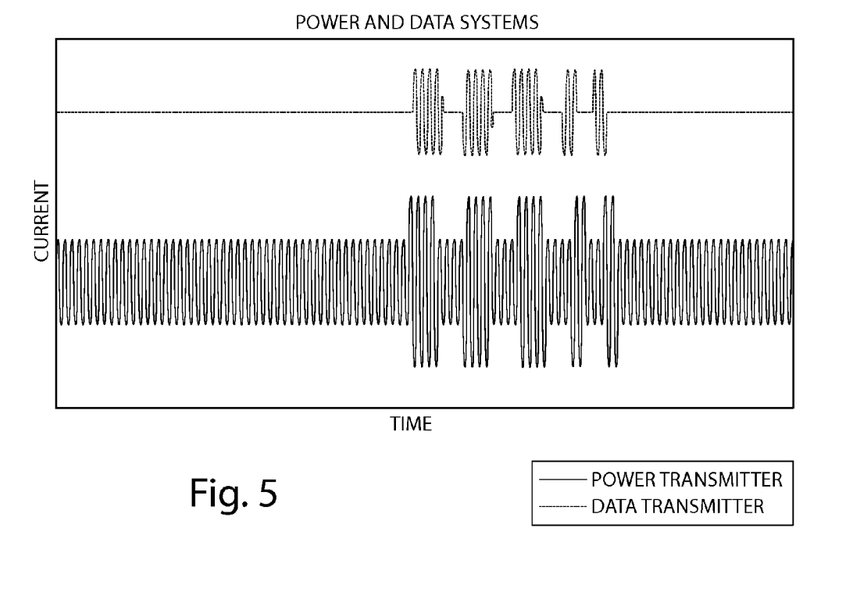
FIG. 5 shows current flowing through an inductive data transmitter and an inductive power transmitter in one embodiment.

In one embodiment, where one of the inductive sub-systems is a data transfer inductive sub-system and one of the inductive sub-systems is a power transfer inductive sub-system, communication from the data transfer inductive sub-system can be mimicked by the inductive power transfer sub-system so that both sub-systems transmit the communication, thereby reducing interference between the two systems without stopping inductive power transfer. FIG. 5 illustrates how communication through a data transmitter can be mimicked in a power transmitter by showing current flowing through both the inductive data transmitter and the inductive power transmitter over time.

Figure 15:
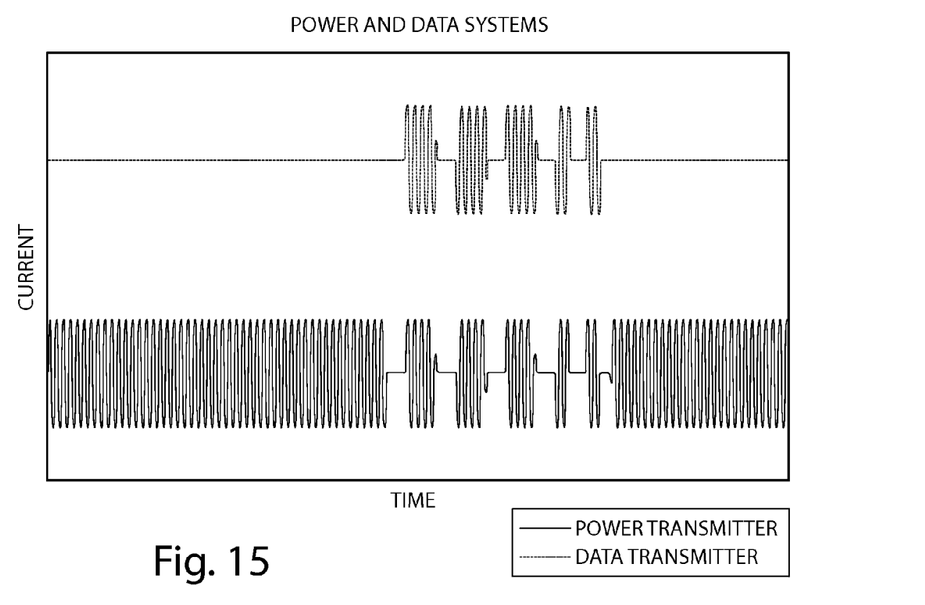
FIG. 15 shows an embodiment where the wireless power transmitter turns its coil off during time periods corresponding with an off state of the data transmitter, in an effort to more closely match the field levels seen by the data receiver.

In this embodiment, a power transmitter mimics a data transmitter while the inductive power transmitter is inductively supplying power to a device and the data transmitter is communicating information to a different device. Many data transmitters operate by changing a characteristic of the power in the data transmitter in a way that can be recognized by a receiver. For example, frequency modulation and amplitude modulation are two common ways to communicate using an inductive data transmitter. FIG. 5 illustrates how the amplitude modulated communication signal in the data transmitter can be mimicked in the inductive power transmitter without stopping the supply of power. That is, the data signal being transmitted by the data transmitter is replicated or mimicked by the inductive power transmitter while it is charging a device by modulating the power signal. In this way, the inductive power transmitter can continue to supply energy to a first device and also transmit a communication signal to a second device. The first device being powered by the inductive power transmitter will not be significantly effected by the amplitude modulation of the power transmitter signal, however any interference that might have been caused by the inductive power transmitter is reduced because the inductive power transmitter mimics the data transmitter. In an alternative embodiment, illustrated in FIG. 15, the power transmitter system mimics the inductive data transmitter by replicating the data transmitter signal, including the off state of the data transmitter, in an effort to more closely match the field levels seen by the inductive data receiver. In this embodiment, the power delivered to the inductive power receiver can be sufficient to maintain charging such that the inductive power receiver does not indicate that charging has stopped.

The amplitude modulation shown in FIG. 5 can be achieved in a variety of different ways. For example, the modulation can be achieved by adjusting the rail voltage of an driver in the inductive power transmitter, the duty cycle of current in the inductive power transmitter, or the by altering the phase delay between multiple drivers (for example, the phase between the two halves of a full bridge driver). The system the data transmitter can communicate with a frequency modulation scheme, which can be replicated by the inductive power transmitter. In this embodiment, the two systems may not operate at the same frequency as one another, and may vary their frequency of operating over time.

In embodiments that employ mimicking, the inductive power receiver can receive additional or less power while the mimicked signal is being transmitted. In one embodiment, the inductive power receiver provides a minimum amount of power to the inductive power receiver throughout charging so that the inductive power receiver does not drop below a threshold amount of power triggering an event on the device that charging has stopped. In this way, the inductive power receiver can maintain a constant charge and charging is not interrupted. Alternatively, or in addition, the mimicking of the data transfer signal may not significantly effect the amount of power transmitted to the inductive power receiver. Further, the inductive data receiver can be designed to detect small changes in the transmitted signal so that the mimicking does not trigger a significant change in power delivered to the inductive power receiver. To put it another way, the inductive power receiver may have the ability to adjust its operating conditions based on the changes in the transmitted signal of the inductive power transmitter, or the inductive data receiver may detect small changes in the transmitted signal of the power transmitter that have no significant effect on the power transfer, or both. As the mimicking occurs, the amount of power transmitted by the inductive power transmitter will vary with the changes in amplitude and/or frequency that provide the data signal.

In some embodiments, the inductive power transmitter can mimic the data signal while making other adjustments to the system to maintain the desired output power. For example, in one embodiment, where the inductive data transmitter uses frequency modulation, the power transmitter can adjust at least one of rail voltage, duty cycle, and phase to maintain constant amplitude of the power transmission while varying the frequency for data transmission.

In another embodiment, a controller receives communication from multiple sub-systems, analyzes the communication, and determines how to instruct the sub-systems to operate so as to reduce interference. For example, a central controller can communicate with multiple inductive systems. By using a central controller with messages or signals that can be recognized by both inductive systems, a controller can decide to turn one inductive system on while turning the other inductive system off. Alternatively, the central controller can turn on one system, and alter the operation of another system. For example, the frequency or power output of one system can be adjusted in order to reduce interference with the other system that is operating normally. The main controller can determine when and how to specifically control the inductive systems. That is, the main controller can provide specific timing signals, operating frequency information, or other operational information in order to reduce interference. In another embodiment, the central controller can request the inductive systems change state and let the individual transmitter determine the best method for altering operation.

Figure 16:
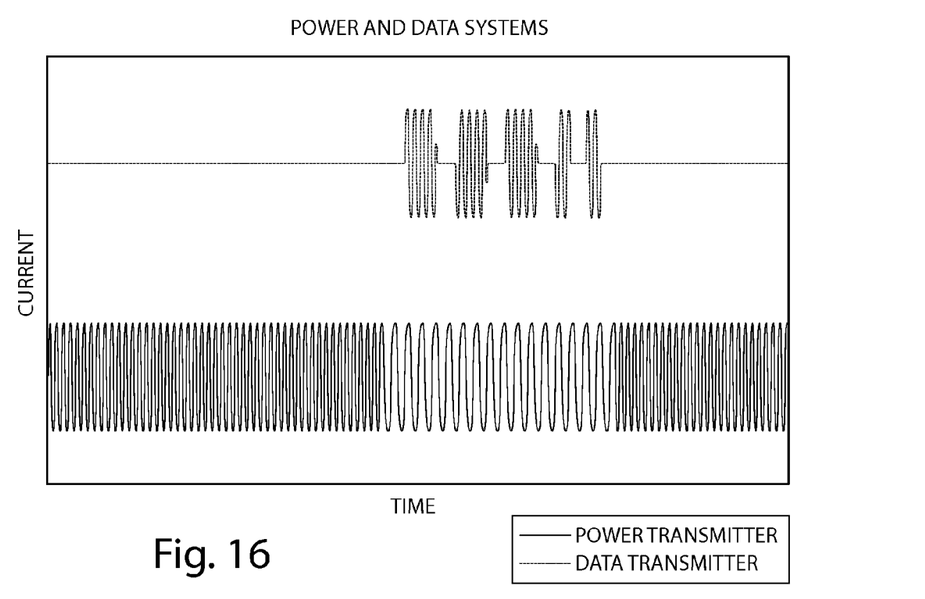
FIG. 16 shows an embodiment where the wireless power transmitter changes its operating frequencies but maintains amplitude during the data transmitters communication to prevent interference during the data transmission.

In one embodiment, in response to an interference causing event, one or more of the inductive sub-systems temporarily adjusts operation to reduce interference. Once one inductive system realizes it may need to alter operation to reduce interference, it can be programmed to adjust operation. For example, in response to a data transmitter event, such as a key fob ping, a wireless power transmitter may adjust its operating frequency to be far enough away from the data transmitter frequency so that it does not interfere during the event. One example of this is illustrated in the graph of FIG. 16. Referring to FIG. 16, the wireless power transmitter changes its operating frequencies but maintains amplitude during the data transmitters communication to prevent interference during the data transmission.

By way of example, in one embodiment, a wireless power standard requires operation above 100 Khz, a wireless data transmitter operates at about 125 Khz, a wireless power transmitter operates at about 110 Khz, and a radio operates in a frequency band starting at about 575 Khz. At these frequencies, the wireless data transmitter and the wireless power transmitter can interfere with one another. However, operating the wireless power transmitter above 140 Khz can cause interference with the radio because of the harmonics that occur above 140 Khz and operating the wireless power transmitter below 100 Khz is undesirable because it is not compliant with the wireless power standard. Accordingly, in one embodiment interference can be reduced by temporarily adjusting operation to reduce interference during an interference causing event. A wireless data transmitter may operate periodically for a short period of time. Accordingly, the inductive power transmitter can be programmed to adjust operation during those periods of time to reduce or avoid interference with the wireless data transmitter. The wireless power system shown in this example can also adjust rail voltage, phase, or duty cycle to maintain a constant power transmitted to the remote device while the frequency is being adjusted.

Figure 14:
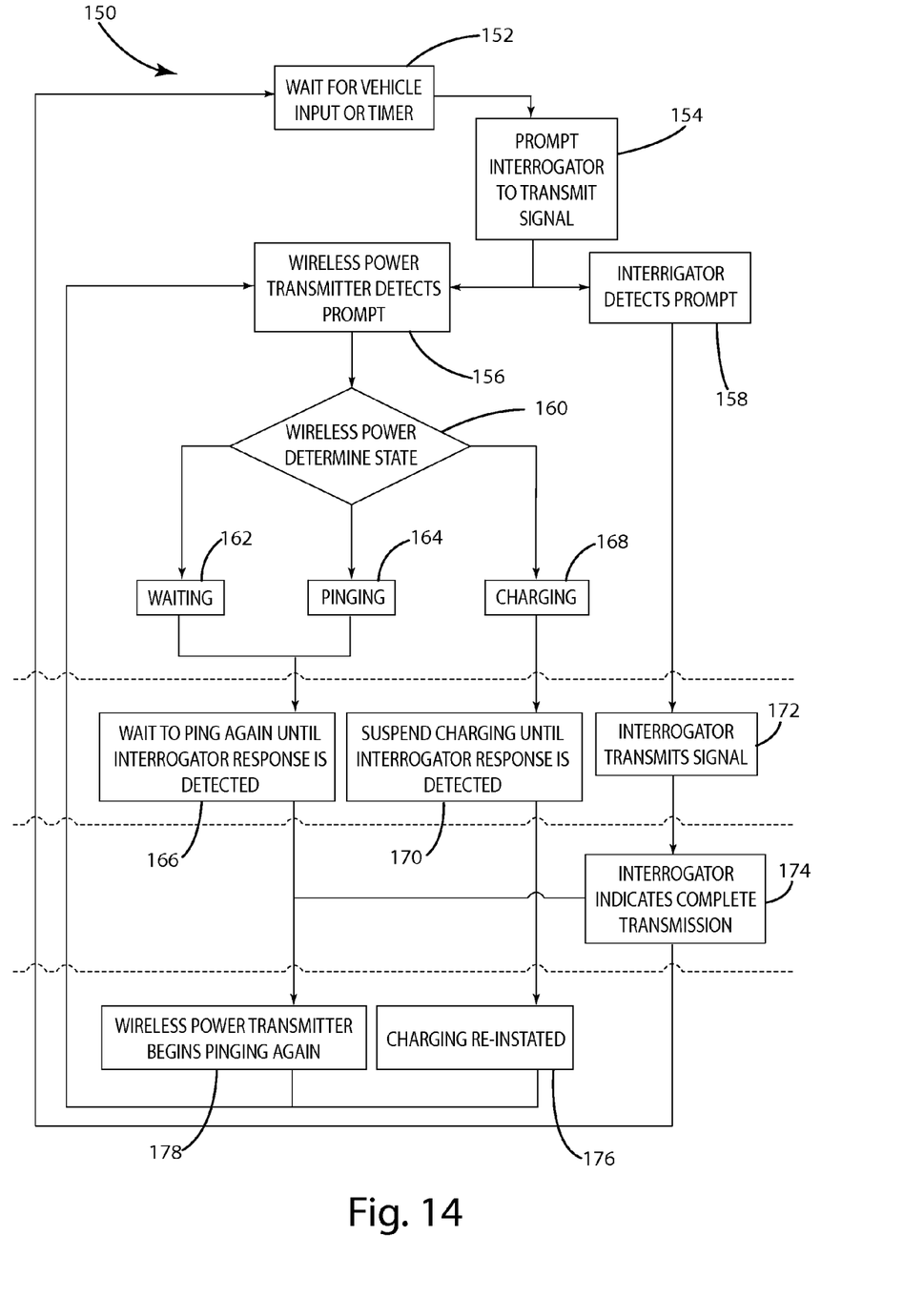
FIG. 14 shows a flowchart of a system level approach to mitigating interference, using an example of a wireless power transmitter in a vehicle with an inductive data interrogator.

In another embodiment, in response to an interference causing event, one or more of the inductive sub-systems temporarily adjusts operation to reduce interference. FIG. 14 illustrates a flowchart 150 of such a system implemented in a vehicle equipped with a wireless power transmitter and an inductive data interrogator. The flowchart illustrates a system level approach to mitigating interference. A vehicle bus or other vehicle communication system provides vehicle input or a timer event to the system to trigger operation 152. In response, the system prompts the data interrogator to transmit a data signal 154. For example, in response to the vehicle shifting into gear, a car door opening, a start button on the vehicle being pushed, or based on a periodic timer event, such as a the vehicle checking to see if the key fob is still present in the car, the data interrogator transmits a data signal. In response, both the wireless power system 156 and the interrogator take action 158. The wireless power transmitter determines its state 160. If the wireless power system is in a waiting 162 or pinging state 164, then it waits to ping again until the interrogator response is detected 166. If the wireless power system is charging 168, then it can suspend charging until the interrogator response is detected 170. Alternatively, the interrogator signal could be mimicked on the inductive power transmitter or the frequency of operation of the inductive power transmitter could be adjusted, as discussed above. The interrogator is programmed to allow time for the wireless power transmitter to suspend charging if it was occurring and then it transmits its signal 172. Once the interrogator indicates that its communication cycle is complete 174, charging can be re-instated 176 or the wireless power transmitter can move back to a pinging state 178.

In another aspect, interference between multiple inductive sub-systems can be mitigated by specific physical positioning of the transmitters of the inductive sub-systems.

Figure 6:
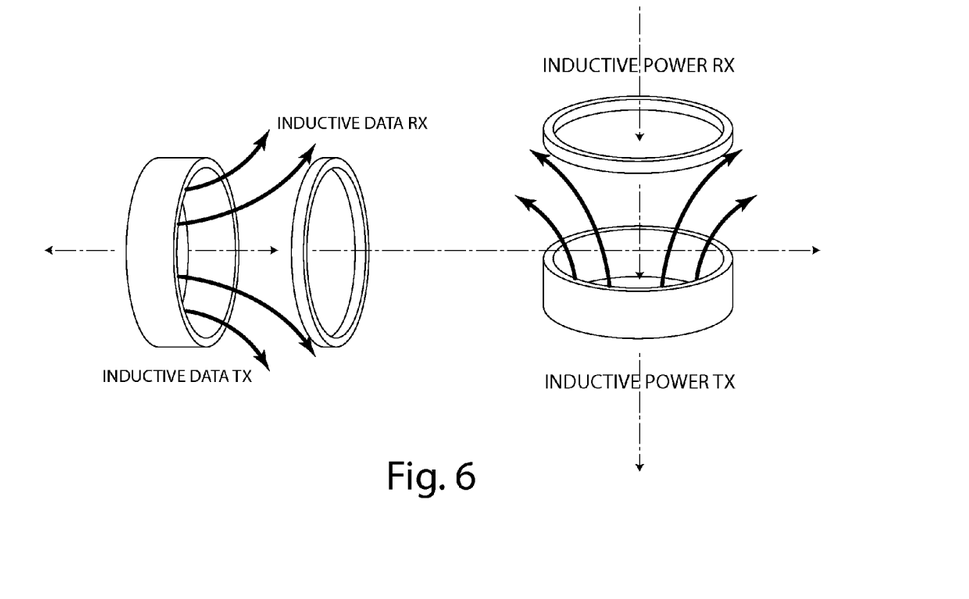
FIG. 6 shows an inductive data system that is in proximity to an inductive power system where the axes of the two systems are orthogonal to one another.

In one embodiment, one inductive system uses a primary inductor whose axis is geometrically orthogonal to a primary inductor in another inductive system. In this embodiment, the axis of one inductive system is perpendicular to a second inductive system and is located on the same plane, as shown in FIG. 6. In this embodiment, coupling and therefore interference between one inductive system and another is theoretically reduced to zero because the magnetic fields are perpendicular to the axis of the windings of the inductors, meaning the net amount of flux passing through each inductor generated by the orthogonal inductor in the other inductive system is 0. In this embodiment, the lack of coupling means that the systems will not interact with one another.

Figure 7:
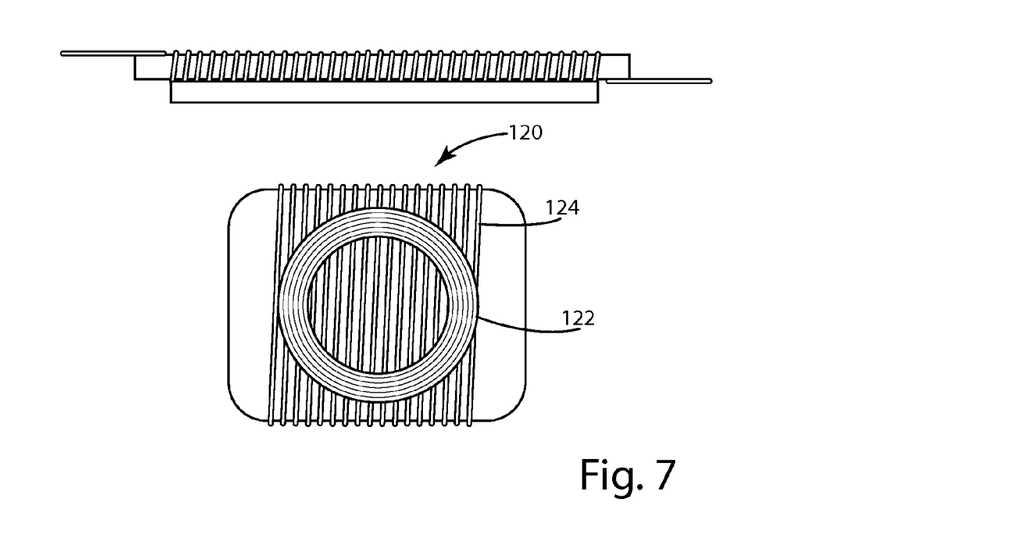
FIG. 7 shows an inductive transmitter or an inductive receiver that utilizes a planar wound power coil and an axial wound communication coil wound around high permeability material located behind the power coil.
Figure 8:
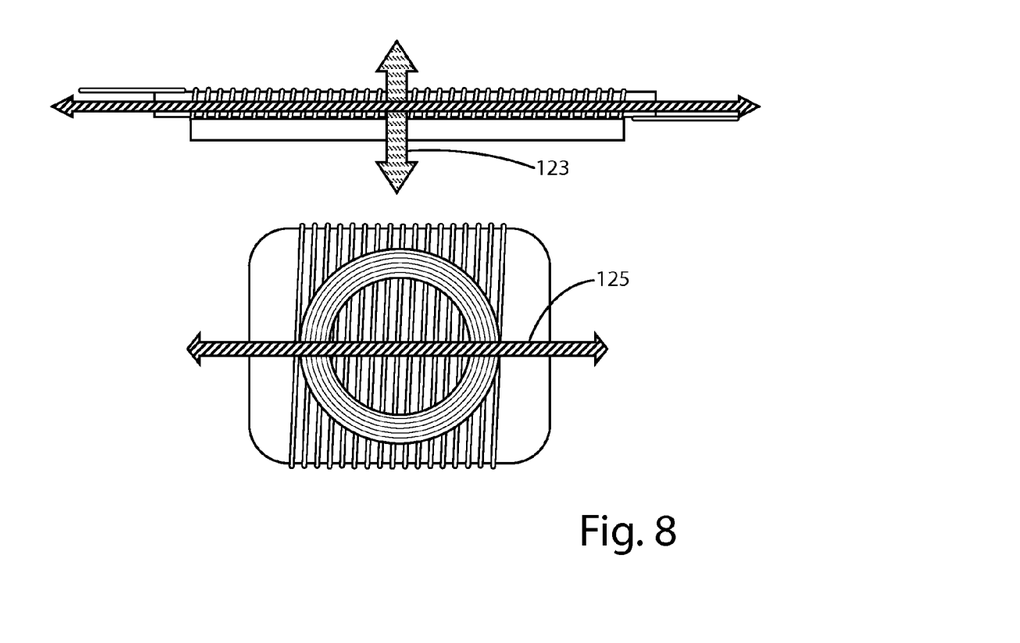
FIG. 8 shows the axis of the magnetic field used for power transfer and an axis of the magnetic field used for data transfer.
Figure 11:
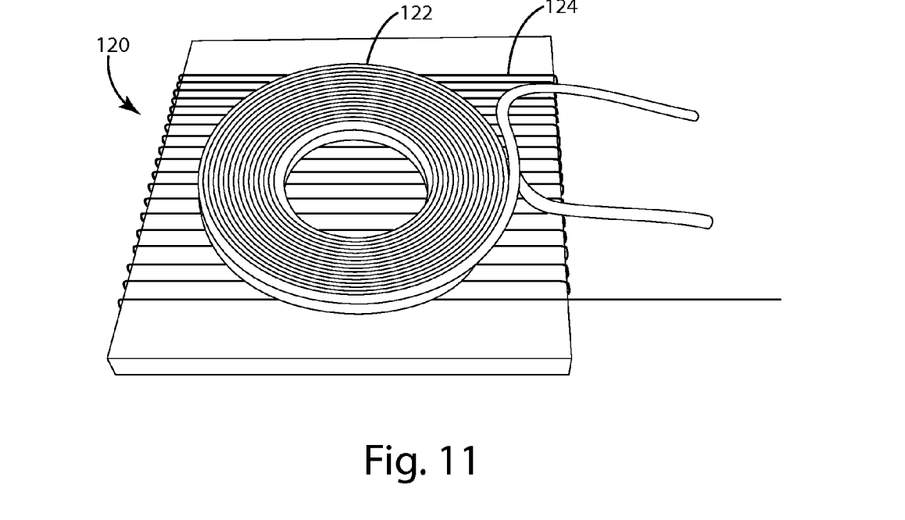
FIG. 11 shows a photograph of a planar wound inductive power coil with an axial wound inductive communication coil.

FIG. 7 shows an inductive element 120 that includes two coils 122, 124. One coil is an inductive power coil and one is a communication coil. FIG. 11 shows a prototype of the inductive element. The inductive element 120 can be utilized as an inductive power receiver, inductive data transmitter, inductive power receiver, inductive data receiver, or any combination thereof. The inductive system utilizes both power and data transfer, using a different coil for each. The coils 122, 124 are made to be orthogonal to one another by winding one in a planar configuration and one in an axial configuration. The axially wound coil is wound around a high permeability material located behind the planar coil. The axes 123, 125 of the windings are shown in FIG. 8. In the current embodiment, the data coil is wound around some high permeability material. In alternative embodiments, the data coil can be wound around a low permeability material instead.

Figure 9:
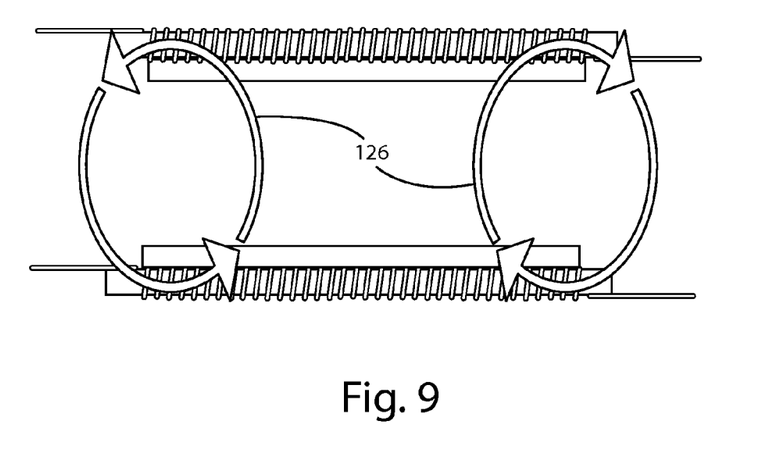
FIG. 9 shows the lines of flux between the an inductive power transmitter and an inductive power receiver.

FIG. 9 illustrates representative flux lines 126 of the power transfer between two inductive elements 120 described in connection with FIG. 7. The flux lines of the power transfer pass through the center of the power transfer coils and into the high permeability material. As the flux lines pass through the highly permeable material, they travel in the horizontal (or near horizontal) direction, coupling into the data transmission coils. However, there are equal lines of flux traveling in opposite directions through the data transfer coils, cancelling the resulting coupling effect.

Figure 10:
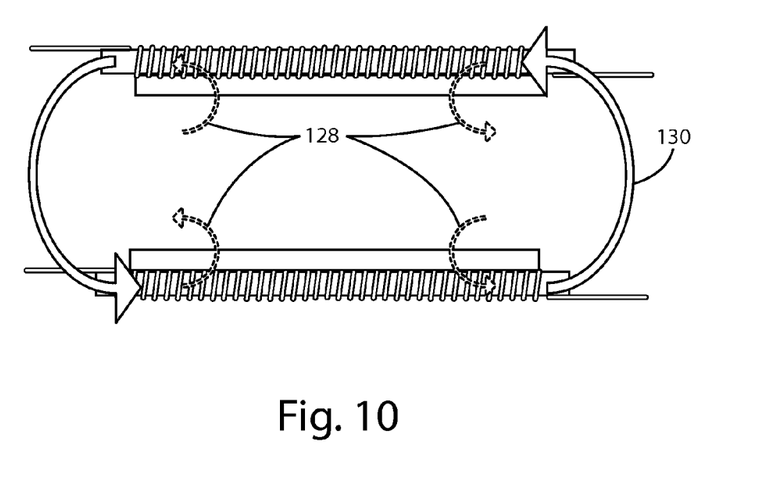
FIG. 10 shows the lines of flux between the inductive data transmitter and the inductive data receiver.

Likewise, in FIG. 10, the lines of flux 130 for the data transfer couple between the data transfer coils, and while some leakage field 128 may pass through the center of the power transfer coils, the leakage flux flows equally (or nearly equal) in both directions through the center, cancelling out the majority of resulting flux coupling.

In this embodiment, an inductive power transfer system may utilize this method when a high amount of power transfer is desired, and the communication method desired is an amplitude modulation scheme. In order to achieve sufficient modulation depth, the power transfer carrier may be amplitude modulated with a high amount of power (>1 Watt), wasting power in the system. By transmitting communication using a coil orthogonal to a power transfer coil, the amplitude modulation of the data transfer may be very low in power. Also, the data transfer rate may no longer be limited to the resonant frequency and operating frequency of the power transfer system, and may be at a much higher speed.

Figure 12:
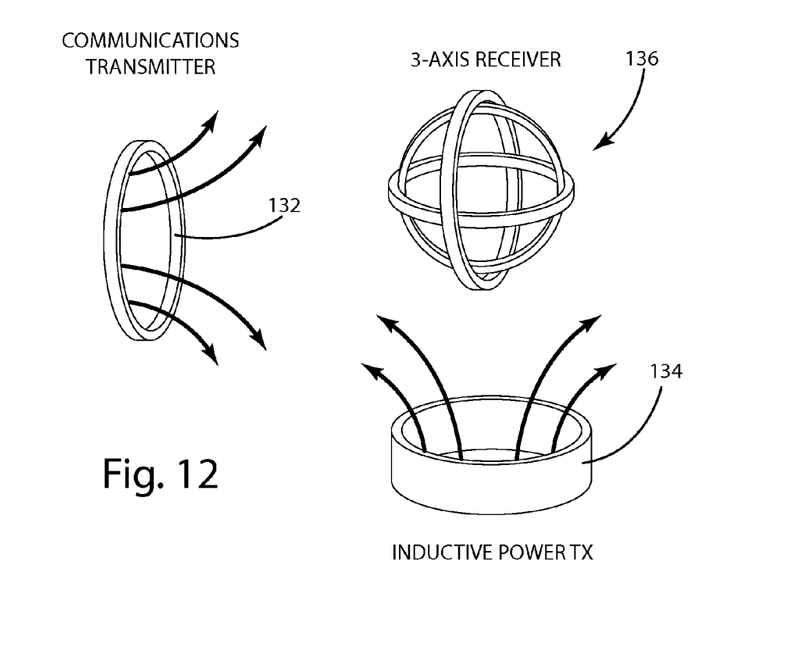
FIG. 12 shows a 3-axis combination inductive power and inductive data receiver, receiving both power and communications from two different transmitters placed orthogonal to one another.

FIG. 12 illustrated orthogonal power transfer 134 and data transfer coils 132 in conjunction with a three-axis receiver 136 that can be configured to receive either power or communication on any of its coils, and may switch between selected coils as the device embedding the three-axis receiver is rotated, and the coupling between power and data coils changes. This can be accomplished by including a sensor connected to each coil in the three axis receiver and programming a controller to selectably connect one of the coils to communication circuitry and one of the coils to a load, such as a battery for charging. Alternatively, each coil may be able to detect communications or power remote device, or both.

Figure 13:
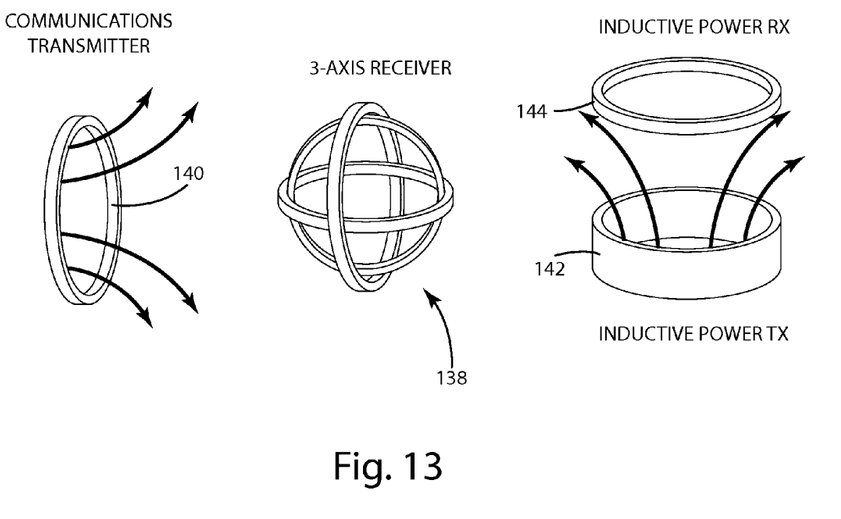
FIG. 13 shows a 3-axis inductive data receiver for receiving data from an inductive data transmitter while in close proximity to an inductive power transfer system.

In one embodiment, the power transfer coil 134 and data transfer coil work in conjunction with separate elements. FIG. 13 shows a three-axis receiver 138 that detects data transfer from the communications transmitter 140 that is oriented orthogonal to the power transmitter 142. In this configuration, the 3-axis receiver can be oriented in any fashion and be able to select a coil that is well coupled to the communications transmitter but poorly coupled (due to the orthogonal nature of the axis of the coils) to the power transmitter. The power transmitter 142 can transfer power to an inductive power receiver 144. For example, a vehicle may include a communication transmitter for communicating with a keyfob that has a 3-axis receiver and an inductive power transmitter for powering a cellular telephone that includes an inductive power receiver.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for reducing electromagnetic interference between a first inductive system and a second inductive system, the method comprising:
   determining there is interference between the first inductive system and the second inductive system;
   in response to determining there is interference between the first inductive system and the second inductive system, adjusting operation of the first inductive system to reduce the interference;
   wherein adjusting operation of the first inductive system includes adjusting an operating frequency of the first inductive system away from an operating frequency of the second inductive system whereby interference between the first inductive system and the second inductive system is reduced;
   wherein the first inductive system adjusts at least one of rail voltage, phase, and duty cycle to maintain constant power transfer to a device while the operating frequency of the first inductive system is adjusted, wherein said adjusting operation of the first inductive system includes mimicking a communication signal of the second inductive system.

2. The method for reducing interference between the first inductive system and the second inductive system of claim 1 wherein said determining includes receiving a communication from at least one of the first inductive system and the second inductive system indicative of an interference causing event.

3. The method for reducing interference between the first inductive system and the second inductive system of claim 1 wherein said determining includes receiving a system prompt.

4. The method for reducing interference between the first inductive system and the second inductive system of claim 3 wherein the system prompt includes at least one of a vehicle shifting into gear, a door opening, and a start button being pressed.

5. The method for reducing interference between the first inductive system and the second inductive system of claim 3 wherein the system prompt includes a timer event.

6. The method for reducing interference between the first inductive system and the second inductive system of claim 1 including receiving communication from the first inductive system and the second inductive system, wherein the determining includes analyzing the communication, and instructing the first inductive system to operate so as to reduce interference between the first inductive system and the second inductive system.

7. The method for reducing interference between the first inductive system and the second inductive system of claim 1 wherein the adjusting operation of the first inductive system to reduce the interference includes coordinating with the second inductive system to operate out of phase with respect to the second inductive system to reduce interference.

8. The method for reducing interference between the first inductive system and the second inductive system of claim 7 wherein the first inductive system and the second inductive system operate at ninety degrees out of phase.

9. A system for reducing electromagnetic interference comprising:
   a first inductive system;
   a second inductive system; and
   a controller in communication with at least one of the first inductive system and the second inductive system, wherein the controller is programmed to determine whether there is interference between the first inductive system and the second inductive system, and in response to determining there is interference, adjusting operation of the first inductive system to reduce the interference;
   wherein adjusting operation of the first inductive system includes adjusting an operating frequency of the first inductive system away from an operating frequency of the second inductive system whereby interference between the first inductive system and the second inductive system is reduced;
   wherein the first inductive system adjusts at least one of rail voltage, phase, and duty cycle to maintain constant power transfer to a device while the operating frequency of the first inductive system is adjusted, wherein said adjusting operation of the first inductive system includes mimicking a communication signal of the second inductive system.

10. The system for reducing interference of claim 9 wherein said determining includes receiving a communication from at least one of the first inductive system and the second inductive system indicative of an interference causing event.

11. The system for reducing interference of claim 9 wherein said determining includes receiving a system prompt.

12. The system for reducing interference of claim 11 wherein the system prompt includes at least one of a vehicle shifting into gear, a door opening, and a start button being pressed.

13. The system for reducing interference of claim 11 wherein the system prompt includes a timer event.

14. The system for reducing interference of claim 9 wherein the controller is programmed to receive communication from the first inductive system and the second inductive system, wherein the determining includes analyzing the communication and instructing at least one of the first inductive system and the second inductive system to operate so as to reduce interference between the first inductive system and the second inductive system.

15. The system for reducing interference of claim 9 wherein the adjusting operation of the first inductive system to reduce interference includes coordinating with the second inductive system to operate out of phase with respect to the second inductive system to reduce interference.

16. The system for reducing interference of claim 15 wherein the first inductive system and the second inductive system operate at ninety degrees out of phase.

* * * * *